UNITED STATES PATENT OFFICE.

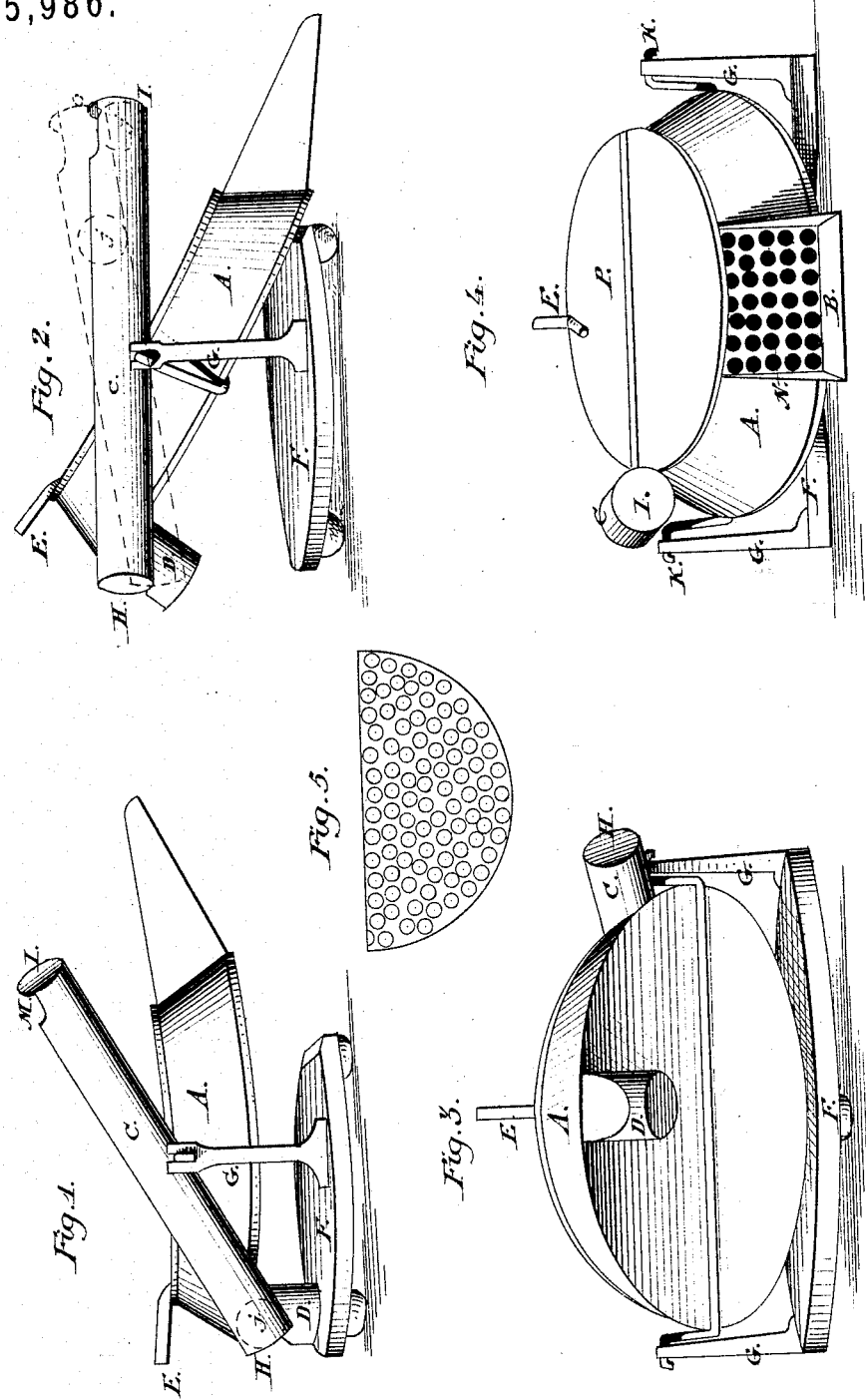

OTTO DUBOIS, OF FALL RIVER, MASSACHUSETTS.

IMPROVEMENT IN MACHINES FOR WASHING PHOTOGRAPHIC PRINTS.

Specification forming part of Letters Patent No. 165,986, dated July 27, 1875; application filed May 6, 1875.

*To all whom it may concern:*

Be it known that I, OTTO DUBOIS, of Fall River, in the county of Bristol and State of Massachusetts, have invented a Machine for Washing Photograph-Prints, of which the following is a specification:

My invention consists in a combination of a vessel or pan and a lip or spout and weights, so that a stream of water running into the vessel or pan will automatically fill and empty the same alternately, and of a perforated sheet or screen attached to or near the upper rim of said vessel or pan to keep the prints from adhering to the half-cover of said vessel or pan during the operation of washing.

A circular vessel or pan is suspended upon its opposite sides upon supports, each of which, by a goose-neck, swings or tilts upon a standard, the lower end of which standard is affixed to a platform. The front half of the upper base of the vessel or pan is covered, which cover has, spreading over its inside surface, but not in contact therewith, a perforated sheet or screen attached to or near the upper rim of said vessel or pan. A lip or spout projects from the middle of the front half of the vessel or pan, there being a perforated partition between the vessel or pan and lip or spout. A tube is affixed to the side of the vessel or pan, nearly parallel to the bottom of the lip or spout, in which tube are placed shifting or rolling weight or weights. A hollow foot containing weights is affixed to the back part of the vessel or pan nearly opposite to the lip or spout, which foot may or may not rest upon the platform. A water-supply pipe is affixed to the upper rim of the vessel or pan, and is bent obliquely into such a position as to cause a circular current of water in the vessel or pan when it runs through the pipe.

Figure 1 is a side view of a machine embodying my invention, in position to receive and retain water. Fig. 2 is a side view of said machine in the position of emptying its water. Fig. 3 is a back view of said machine in the position of emptying its water. Fig. 4 is a front view of said machine in the position of emptying its water. Fig. 5 is a view of the perforated sheet or screen, spreading over the inside surface of the cover to half of the upper base of the vessel or pan.

A is the body of the vessel or pan. B is the lip or spout. C is the tube containing shifting or rolling weight or weights. D is the hollow foot containing weights. E is the water-supply pipe. F is the platform. G G are the standards. H is the rear end of the tube C containing weight or weights. I is the front end of said tube. J is a shifting or rolling weight in said tube. K K are the goose-necks swinging or tilting upon the standards. L is the cover upon half of the upper base. M is an aperture in tube C, through which to put and take out weights. N is the perforated partition between the vessel or pan and lip or spout.

The prints to be washed are put into the vessel or pan through P, which is the uncovered half of the top thereof. A stream of water is continually flowing through the supply-pipe E obliquely into the vessel or pan, causing a circular current in the same, and the water therein rises and flows through the perforated partition N into the lip or spout. When a sufficient quantity has flowed into the lip or spout, the heaviness of the water tilts the vessel or pan down, and causes the weight J in the tube C to move from the rear end H to the front end I, which weight J remains at I, and keeps the vessel or pan tipped down until all or nearly all the water has run out, when the weight in the hollow foot D tilts the front of the vessel or pan upward until the tube C is in the position represented by dotted lines O in Fig. 2, which immediately causes the weight J to move to the rear end H, and brings the vessel or pan into the position represented in Fig. 1. This filling and emptying continue alternately and regularly so long as the stream of water is flowing in through the supply-pipe.

During the operation of the machine, the perforated sheet or screen, by the action of air and water above it, and by presenting a smaller solid surface, prevents the prints from adhering to the cover.

I make no claim to the mode in which the vessel or pan is suspended by goose-necks upon standards, nor to the water-supply pipe, nor to the perforated partition between the vessel or pan and lip or spout, for I am aware that these are not new; but

I claim as my invention—

The combination of the vessel or pan A, tube C, provided with the movable weight, weighted foot D, and lip or spout B, substantially as and for the purpose hereinbefore set forth.

OTTO DUBOIS.

Witnesses:
 WILLIAM T. SEWARD,
 JOHN SHORT.